United States Patent
Lu

(10) Patent No.: US 9,453,747 B2
(45) Date of Patent: Sep. 27, 2016

(54) METERING AND SEPARATING DEVICE FOR NATURAL GAS

(76) Inventor: Jiuqing Lu, Urumqi (CN)

( * ) Notice: Subject to any disclaimer, the term of this patent is extended or adjusted under 35 U.S.C. 154(b) by 1115 days.

(21) Appl. No.: 13/521,032

(22) PCT Filed: Jan. 7, 2011

(86) PCT No.: PCT/CN2011/070065
§ 371 (c)(1),
(2), (4) Date: Jul. 6, 2012

(87) PCT Pub. No.: WO2011/082678
PCT Pub. Date: Jul. 14, 2011

(65) Prior Publication Data
US 2013/0006545 A1  Jan. 3, 2013

(30) Foreign Application Priority Data
Jan. 7, 2010  (CN) .......................... 2010 1 00455002

(51) Int. Cl.
*G01F 1/42* (2006.01)
*G01F 15/08* (2006.01)

(52) U.S. Cl.
CPC ..................................... *G01F 1/42* (2013.01)

(58) Field of Classification Search
CPC .............. G01F 1/42; G01F 1/34; G01F 1/74; G01F 7/00; G01F 7/005; G01F 15/08
See application file for complete search history.

(56) References Cited

FOREIGN PATENT DOCUMENTS

CN   101144732 A  *  3/2008

OTHER PUBLICATIONS

CN 101144732A, Mar. 2008, 16 pp.*
CN 101144732A—English Translate, Mar. 2008, 11 pp.*
Chirinos et al., Liquid Carry-Over in Gas/Liquid Cylindrical Cyclone Compact Separators, Sep. 2000, SPE Journal 5(3), pp. 259-267.*
Wang et al., Dynamic Simulation and Control System Design for Gas-Liquid Cylindrical Cyclone Separators, 1998, SPE 49175, pp. 545-560.*

* cited by examiner

*Primary Examiner* — Toan Le

(57) ABSTRACT

The present invention relates to a field of measuring technology of oil and gas flow, solving the problem of separating and metering several gas wells separately, includes: an electric liquid discharge valve, a demister, a liquid flow meter, a pressure transmitter, a differential pressure transmitter, a temperature sensor, a plate-turnover liquid level gauge, a dew-point meter, and a flow computer, wherein a multi-tubes cyclone separator consists of 2~100 tubular containers, the multi-tubes cyclone separator is connected with the liquid flow meter and the electric liquid discharge valve via a liquid exit tube, and connected with orifice plate flow meters via an annular tube and a gathering tube in parallel, the electric liquid discharge valve, the liquid flow meter, the plate-turnover liquid level gauge, the orifice plate flow meters, the pressure transmitter, the differential pressure transmitter, the temperature sensor, and the dew-point meter are connected with the flow computer via data lines.

12 Claims, 3 Drawing Sheets

METERING AND SEPARATING DEVICE FOR NATURAL GAS

CROSS REFERENCE OF RELATED APPLICATION

This is a U.S. National Stage under 35 USC 371 of the International Application PCT/CN2011/070065, filed on Jul. 1, 2011.

BACKGROUND OF THE PRESENT INVENTION

1. Field of Invention

The present invention relates to a field of measuring technology of oil and gas flow, and more particularly to a flow rate measuring and separating device for natural gas.

2. Description of Related Arts

Treating and measuring technology develops rapidly along with the exploring and developing of natural gas on sea and land. Metering and separating technologies of natural gas, liquid condensate natural gas, moisture, and etc., are more and more valued. Precise metering of natural gas containing liquid provides reliable original materials for production monitoring and oil storage management. Traditionally, the natural gas containing liquid is metered after being separating by large-scale tank separator. Due to the high cost of the separator, several gas wells are led to a metering and separating station, and are driven by a separator to be separated one by one through switching the gas well, and then metered by a single-phase flow meter.

SUMMARY OF THE PRESENT INVENTION

An object of the present invention is to provide a metering and separating device for natural gas, solving the problem of separating and metering several gas wells separately, comprising: an electric liquid discharge valve, a liquid flow meter, a pressure transmitter, a differential pressure transmitter, a temperature sensor and a flow computer, wherein a multi-tubes cyclone separator consisting of 2~100 tubular containers, each of the tubular containers in periphery has a side close to a top thereof communicated with an annular tube via a shunt tube, each of the tubular containers in periphery is connected tangentially with one of the shunt tubes, a valve is provided on each of the shunt tubes, the an annular tube is communicated with a gathering tube, each of the tubular containers has the top communicated with a main gas tube via a gas guide sub-tube, each of the gas guide sub-tubes is provided in center of the top of each of the tubular containers, and has a first end inserted into the tubular container for 10 mm~100 mm, and a second end communicated with the main gas tube, a vent is provided on an end of the main gas tube, the main gas tube is communicated with a gas exit tube, a dew-point meter is provided on the gas exit tube, each of the tubular containers has a bottom communicated with a main liquid tube via a liquid guide sub-tube, the main liquid tube is communicated with a liquid exit tube, a demister is provided on the top of the tubular container, consisting of a tube, a filter, and a flange plate, the tube has a first end inserted into the tubular container, and a second end extruding out of the tubular container, the filter is mounted inside an inner tube, an air inlet is provided on a bottom of a first side of the inner tube, an air outlet is provided on a top of a second side of the inner tube, the flange plate is provided on an end of an outer tube, the outer tube has a bottom communicated with a liquid return tube, the liquid return tube is communicated with the bottom of the tubular container, the inner tube of the demister is inclinedly connected with a wall of the tubular container, an inclined angle a is 0°~45°, the outer tube is vertically connected with the wall of the tubular container, a plate-turnover liquid level gauge is provided on one of the tubular containers in periphery, the multi-tubes cyclone separator is connected with the liquid flow meter and the electric liquid discharge valve via the liquid exit tube, the multi-tubes cyclone separator is connected with 2~30 orifice plate flow meters via the annular tube and the gathering tube in parallel, two inverted cone orifice plates are respectively provided on a front end and a rear end of a throttling element of each of the orifice plate flow meters, an angle of the inverted cone orifice plates $\alpha$ or $\beta$ is 40°~160°, the pressure transmitter is provided in the front end of the orifice plate flow meters, the differential pressure transmitter is provided on the orifice plate flow meters, the temperature sensor is provided on the rear end of the orifice plate flow meters, the electric liquid discharge valve, the liquid flow meter, the plate-turnover liquid level gauge, the orifice plate flow meters, the pressure transmitter, the differential pressure transmitter, the temperature sensor, and the dew-point meter are connected with the flow computer via data lines, the present invention utilizes the orifice plate flow meters to measure two-phase flow of natural gas, and then gathers all metered natural gas of single well into the multi-tubes cyclone separator to separate gas from liquid, measures the separated natural gas by the dew-point meter, so as to accomplish real-time measuring and separating of each well, thus has wide measuring range, high measuring precision, precision of gas and liquid up to ±1~2%, liquid contained in oil down to ±3%, has characteristics of light weight, small volume, good separating effect, and determining the number of tubes according to different flow range of the natural gas to ensure separating effect, is reliable, and can be widely applied to real-time measuring and separating of natural gas well.

DETAILED DESCRIPTION OF THE PREFERRED EMBODIMENT

Figure 1:
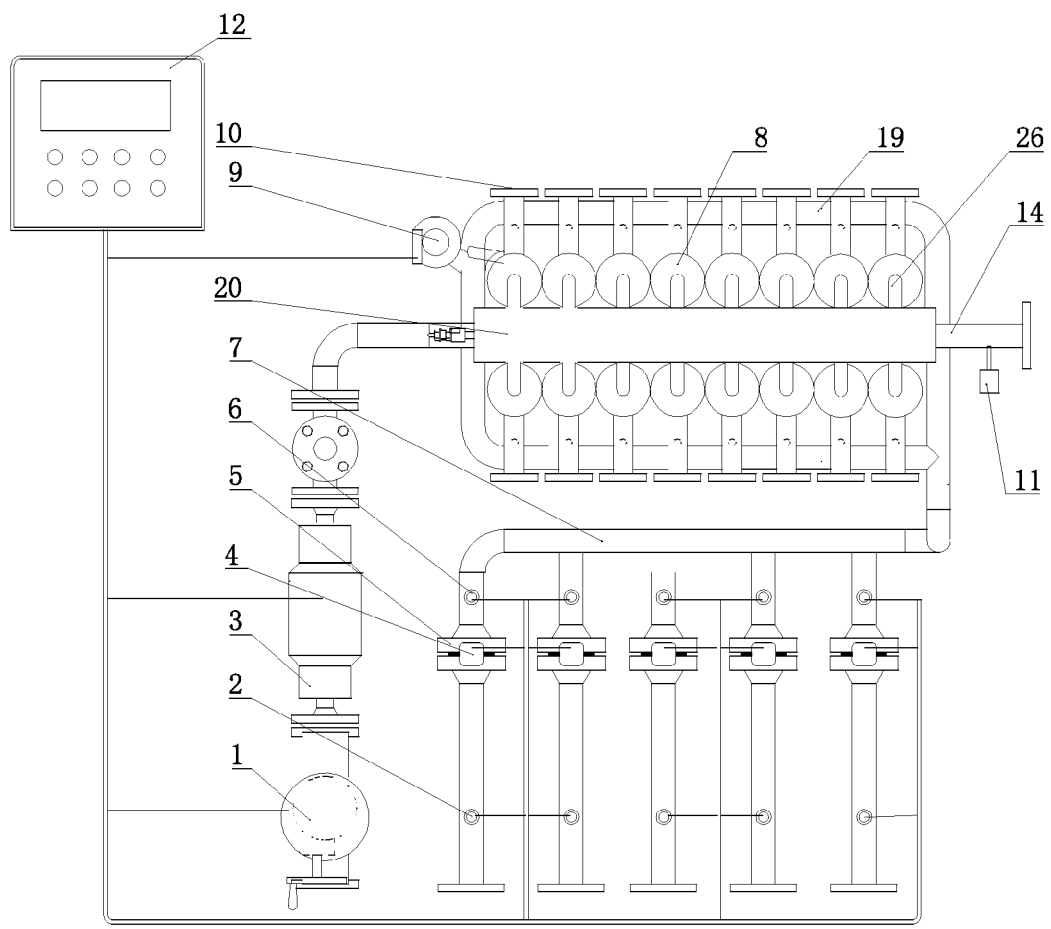
FIG. 1 is a structural sketch view of a metering and separating device for natural gas according to a preferred embodiment of the present invention.
Figure 2:
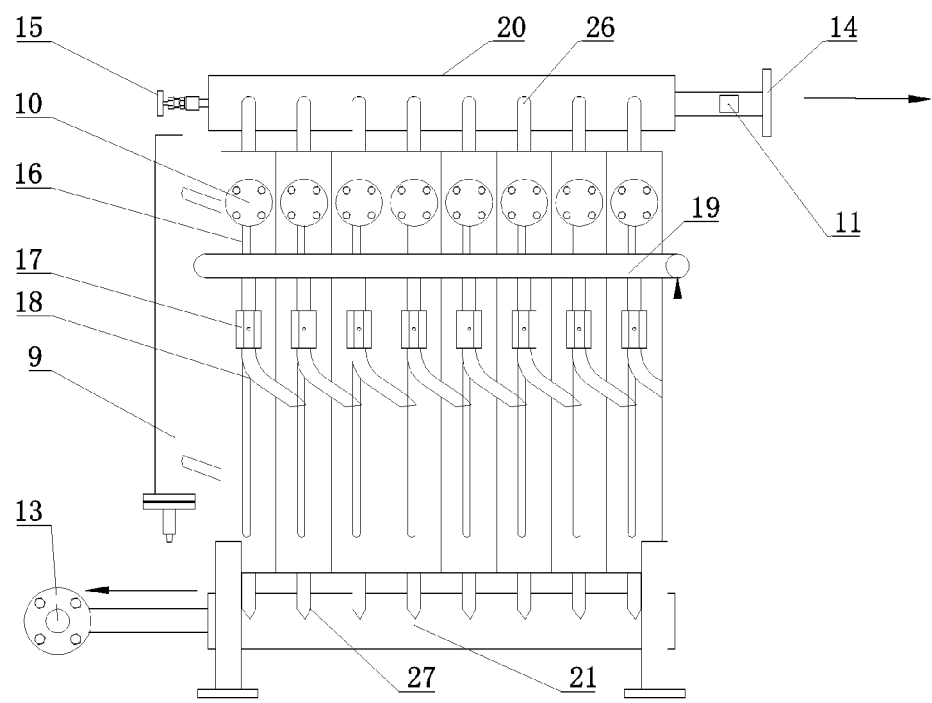
FIG. 2 is a front view of a multi-tubes cyclone separator of FIG. 1.
Figure 3:
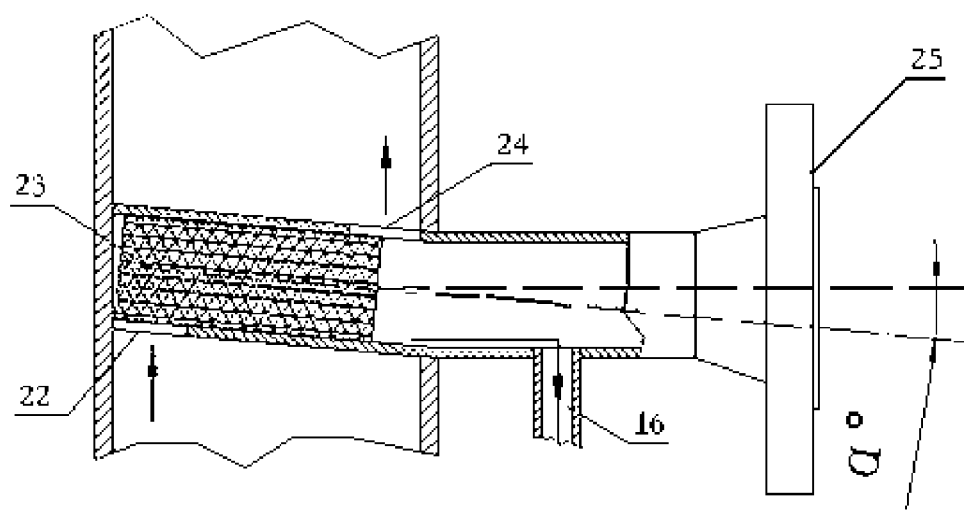
FIG. 3 is a sectional view of a demister of FIG. 1.
Figure 4:
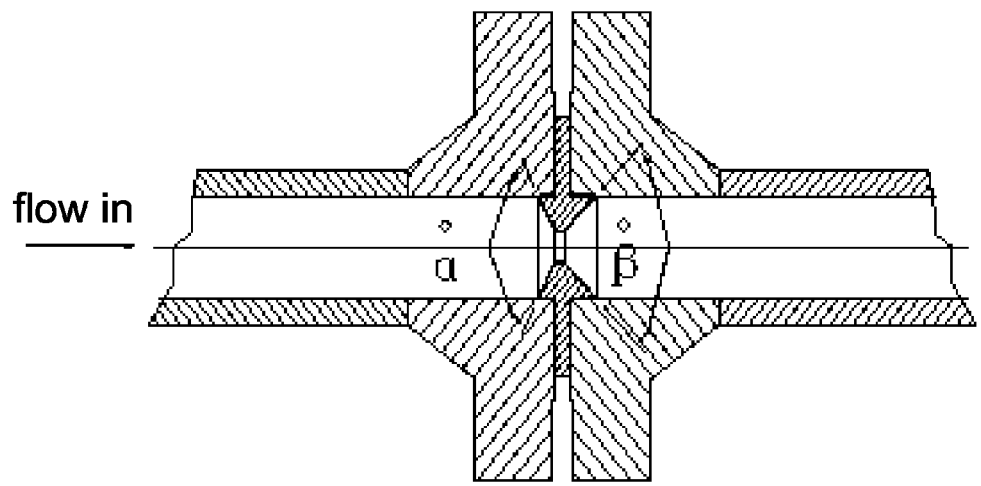
FIG. 4 is a sectional view of an orifice plate flow meter of FIG. 1.
Figure 5:
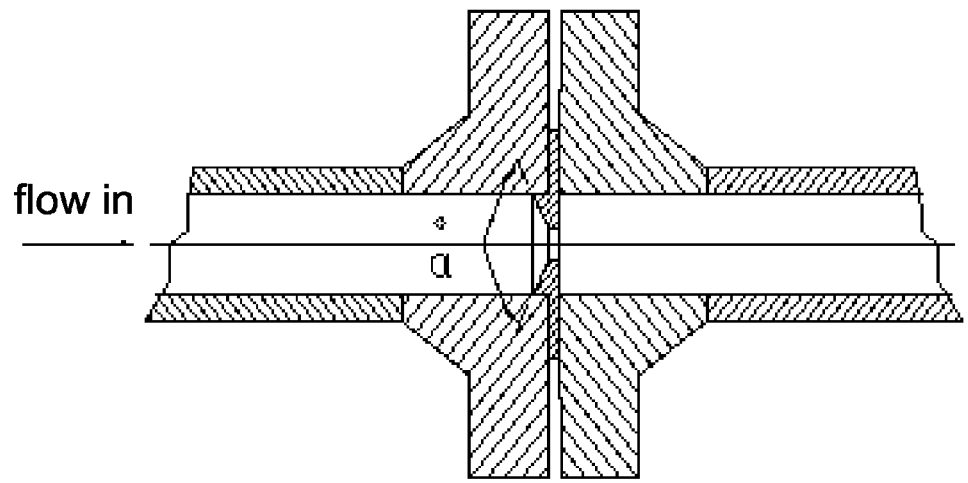
FIG. 5 is a sectional view of an orifice plate flow meter of FIG. 1.

Referring to FIGS. 1-5 of the drawings, a metering and separating device for natural gas according to a preferred embodiment of the present invention is illustrated, comprising:

an electric liquid discharge valve 1, a liquid flow meter 3, a pressure transmitter 2, a differential pressure transmitter 4, a temperature sensor 6 and a flow computer 12, wherein a multi-tubes cyclone separator 8 consisting of 2~100 tubular containers, each of the tubular containers in periphery has a side close to a top thereof communicated with an annular tube 19 via a shunt tube 18, each of the tubular containers in periphery is connected tangentially with one of the shunt tubes 18, a valve 17 is provided on each of the shunt tubes 18, the an annular tube 19 is communicated with a gathering tube 7, each of the tubular containers has the top communicated with a main gas tube 20 via a gas guide sub-tube 26, each of the gas guide sub-tubes 26 is provided in center of the top of each of the tubular containers, and has a first end inserted into the tubular container for 10 mm~100 mm, and a second end communicated with the main gas tube 20, a vent 15 is provided on an end of the main gas tube 20, the main gas tube 20 are communicated with a gas exit tube 14, a dew-point meter 11 is provided on the gas exit tube 14, each of the tubular containers has a bottom communicated with a main liquid tube 21 via a liquid guide sub-tube 27, the main liquid tube 21 is communicated with a liquid exit tube 13, a demister 10 is provided on the top of the tubular container, consisting of a tube, a filter 23, and a flange plate 25, the tube has a first end inserted into the tubular container, and a second end extruding out of the tubular container, the filter 23 is mounted inside an inner tube, an air inlet 22 is provided on a bottom of a first side of the inner tube, an air outlet 24 is provided on a top of a second side of the inner tube, the flange plate 25 is provided on an end of an outer tube, the outer tube has a bottom communicated with a liquid return tube 16, the liquid return tube 16 is communicated with the bottom of the tubular container, the inner tube of the demister 10 is inclinedly connected with a wall of the tubular container, an inclined angle $\alpha$ is 0°~45°, the outer tube is vertically connected with the wall of the tubular container, a plate-turnover liquid level gauge 9 is provided on one of the tubular containers in periphery, the multi-tubes cyclone separator 8 is connected with the liquid flow meter 3 and the electric liquid discharge valve 1 via the liquid exit tube 13, the multi-tubes cyclone separator 8 is connected with 2~30 orifice plate flow meters 5 via the annular tube 19 and the gathering tube 7 in parallel, two inverted cone orifice plates are respectively provided on a front end and a rear end of a throttling element of each of the orifice plate flow meters 5, an angle of the inverted cone orifice plates $\alpha$ or $\beta$ is 40°~160°, whose structure has self-cleaning function to ensure avoiding liquid phase accumulated in an upperstream and a downstream of the throttling element that the liquid phase passes through the throttling element discontinuously to bring big additional resistance and differential pressure fluctuation to reduce measuring precision, and a thickness of the orifice plate is increased to avoid bending of the orifice plate, the pressure transmitter 2 is provided in the front end of the orifice plate flow meters 5, the differential pressure transmitter 4 is provided on the orifice plate flow meters 5, the temperature sensor 6 is provided on the rear end of the orifice plate flow meters 5, the electric liquid discharge valve 1, the liquid flow meter 3, the plate-turnover liquid level gauge 9, the orifice plate flow meters 5, the pressure transmitter 2, the differential pressure transmitter 4, the temperature sensor 6, and the dew-point meter 11 are connected with the flow computer 12 via data lines, and standard cubic flow and liquid condensate flow of natural gas in single well is calculated by the flow computer 12.

What is claimed is:

1. A metering and separating device for natural gas, comprising:

an electric liquid discharge valve, a liquid flow meter, a pressure transmitter, a differential pressure transmitter, a temperature sensor and a flow computer, wherein:

a multi-tubes cyclone separator is connected with said liquid flow meter and said electric liquid discharge valve via a liquid exit tube, said multi-tubes cyclone separator is connected with orifice plate flow meters via a gathering tube, said pressure transmitter is provided in a front end of said orifice plate flow meters, said differential pressure transmitter is provided on said orifice plate flow meters, said temperature sensor is provided on a rear end of said orifice plate flow meters, said electric liquid discharge valve, said liquid flow meter, said orifice plate flow meters, said pressure transmitter, said differential pressure transmitter, and said temperature sensor are connected with said flow computer via data lines;

said multi-tubes cyclone separator consists of 2~100 tubular containers, each of said tubular containers in periphery has a side close to a top thereof communicated with an annular tube via a shunt tube, said an annular tube is communicated with said gathering tube, each of said tubular containers has said top communicated with a main gas tube via a gas guide sub-tube, said main gas tube is communicated with a gas exit tube, each of said tubular containers has a bottom communicated with a main liquid tube via a liquid guide sub-tube, said main liquid tube is communicated with a liquid exit tube, a demister is provided on said top of said tubular container;

each of said tubular containers in periphery of said multi-tubes cyclone separator is connected tangentially with one of said shunt tubes;

each of said gas guide sub-tubes is provided in center of said top of each of said tubular containers, and has a first end inserted into said tubular container for 10-100 mm, and a second end communicated with said main gas tube.

2. The metering and separating device for natural gas, as recited in claim 1, wherein a vent is provided on an end of said main gas tube.

3. The metering and separating device for natural gas, as recited in claim 2, wherein a plate-turnover liquid level gauge is provided on one of said tubular containers in periphery of said multi-tubes cyclone separator, and is connected with said flow computer via data lines.

4. The metering and separating device for natural gas, as recited in claim 3, wherein a dew-point meter is provided on said gas exit tube, and is connected with said flow computer via data lines.

5. The metering and separating device for natural gas, as recited in claim 4, wherein said demister consists of a tube, a filter, and a flange plate, said tube has a first end inserted into said tubular container, and a second end extruding out of said tubular container, said filter is mounted inside an inner tube, an air inlet is provided on a bottom of a first side of said inner tube, an air outlet is provided on a top of a second side of said inner tube, said flange plate is provided on an end of an outer tube, said outer tube has a bottom communicated with a liquid return tube, said liquid return tube is communicated with said bottom of said tubular container.

6. The metering and separating device for natural gas, as recited in claim 5, wherein said inner tube of said demister is inclinedly connected with a wall of said tubular container, and said outer tube is vertically connected with said wall of said tubular container.

7. The metering and separating device for natural gas, as recited in claim 6, wherein an inclined angle α that said inner tube of said demister is inclinedly connected with a wall of said tubular container is 0°~45°.

8. The metering and separating device for natural gas, as recited in claim 7, wherein said orifice plate flow meters are connected in parallel via said gathering tube, and consist of 2~30 orifice plate flow meters.

9. The metering and separating device for natural gas, as recited in claim 8, wherein two inverted cone orifice plates are respectively provided on a front end and a rear end of a throttling element of each of said orifice plate flow meters.

10. The metering and separating device for natural gas, as recited in claim 9, wherein an angle of said inverted cone orifice plates α or β is 40°~160°.

11. The metering and separating device for natural gas, as recited in claim 5, wherein two inverted cone orifice plates are respectively provided on a front end and a rear end of a throttling element of each of said orifice plate flow meters.

12. The metering and separating device for natural gas, as recited in claim 11, wherein an angle of said inverted cone orifice plates α or β is 40°~160°.

* * * * *